United States Patent
Davies et al.

(10) Patent No.: US 10,659,376 B2
(45) Date of Patent: May 19, 2020

(54) THROTTLING BACKBONE COMPUTING REGARDING COMPLETION OPERATIONS

(71) Applicant: International Business Machines Corporation, Armonk, NY (US)

(72) Inventors: Scott E. Davies, Kingston, NY (US); Richard K. Errickson, Poughkeepsie, NY (US); Jinghong Ma, San Diego, CA (US); Andrew W. Piechowski, Lagrangeville, NY (US); Peter K. Szwed, Rhinebeck, NY (US); Ambrose A. Verdibello, Jr., Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 334 days.

(21) Appl. No.: 15/599,212

(22) Filed: May 18, 2017

(65) Prior Publication Data

US 2018/0337867 A1 Nov. 22, 2018

(51) Int. Cl.
*H04L 12/873* (2013.01)
*H04L 12/825* (2013.01)
*H04L 12/861* (2013.01)

(52) U.S. Cl.
CPC .............. *H04L 47/26* (2013.01); *H04L 49/90* (2013.01)

(58) Field of Classification Search
CPC .............................. H04L 47/522; H04L 47/25
See application file for complete search history.

(56) References Cited

U.S. PATENT DOCUMENTS

| | | | |
|---|---|---|---|
| 2003/0065856 A1 | 4/2003 | Kagen et al. | |
| 2009/0073978 A1 | 3/2009 | Craddock et al. | |
| 2009/0271802 A1* | 10/2009 | Biran | G06F 9/544 |
| | | | 719/313 |
| 2012/0192190 A1* | 7/2012 | Basso | G06F 15/1735 |
| | | | 718/102 |
| 2013/0346584 A1* | 12/2013 | Tameshige | G06F 9/5077 |
| | | | 709/223 |
| 2014/0192639 A1 | 7/2014 | Smirnov | |
| 2016/0026605 A1 | 1/2016 | Pandit et al. | |
| 2016/0294926 A1* | 10/2016 | Zur | H04L 49/90 |
| 2017/0187629 A1* | 6/2017 | Shalev | H04L 43/0823 |
| 2017/0187846 A1* | 6/2017 | Shalev | H04L 69/22 |

(Continued)

*Primary Examiner* — Charles C Jiang
*Assistant Examiner* — Voster Preval
(74) *Attorney, Agent, or Firm* — Cantor Colburn LLP; Steven Chiu

(57) ABSTRACT

A computer-implemented method for message handling between a receiver and a sender of a throttling system is provided. The computer-implemented method includes receiving a first message that includes a completion queue element by the receiver from the sender. The computer-implemented method includes detecting that a number of outstanding completion queue elements in a completion queue meets or exceeds a high mark and instructing the sender to enter a throttle mode. The computer-implemented method includes receiving a second message without a completion queue element by the receiver from the sender. The computer-implemented method includes detecting that the number of the outstanding completion queue elements in the completion queue meets or is below a low mark and instructing the sender to exit the throttle mode.

17 Claims, 7 Drawing Sheets

(56) References Cited

U.S. PATENT DOCUMENTS

2017/0346742 A1* 11/2017 Shahar .................... H04L 47/18
2018/0102978 A1*  4/2018 Shen .................. H04Q 11/0066
2018/0212710 A1*  7/2018 Ronneke ............... H04L 1/0002
2018/0227238 A1*  8/2018 Buban ................... H04L 47/564
2018/0309687 A1* 10/2018 Matsuo ................... H04L 47/26

* cited by examiner

THROTTLING BACKBONE COMPUTING REGARDING COMPLETION OPERATIONS

BACKGROUND

The disclosure relates generally to throttling backbone computing regarding completion operations, and more specifically, to a throttling operation by which a message handling side alerts a sender side to stop sending message completions to prevent the message handling side from being busy or overflowed with the completions.

Conventional computer-networking communication standards are used for data interconnects to manage data and messages both among and within computers. In an example case of the conventional computer-networking communications, an originating computer and a receiving computer communicate data and messages. Occasionally, the receiving computer can be in a sleep mode, for example, to save power. In turn, the originating computer executes completion operations of the conventional computer-networking communication standards to wake up the receiving computer so that the receiving computer can process incoming data corresponding to the completion operations. At present, the completion operations can occupy and overflow the processing power of the receiving computer, thereby causing errors.

SUMMARY

According to one or more embodiments, a computer-implemented method for message handling between a receiver and a sender of a throttling system is provided. The computer-implemented method includes receiving a first message that includes a completion queue element by the receiver from the sender. The computer-implemented method includes detecting that a number of outstanding completion queue elements in a completion queue meets or exceeds a high mark and instructing the sender to enter a throttle mode. The computer-implemented method includes receiving a second message without a completion queue element by the receiver from the sender. The computer-implemented method includes detecting that the number of the outstanding completion queue elements in the completion queue meets or is below a low mark and instructing the sender to exit the throttle mode.

According to one or more embodiments, the computer-implemented method can be implemented as a system and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments disclosed herein may include a throttling system, method, and/or computer program product (herein throttling system) that executes improved throttling operations by which a message handling side alerts a message sending side to stop sending completion queue elements. Technical effects and benefits of the improved throttling operations include preventing the message handling side from being busy or overflowed with the completion queue elements, thereby eliminating errors. Thus, embodiments described herein are necessarily rooted in one or more processors of processing systems of the throttling system to perform proactive operations to overcome problems specifically arising in the realm of message handling.

Figure 1:
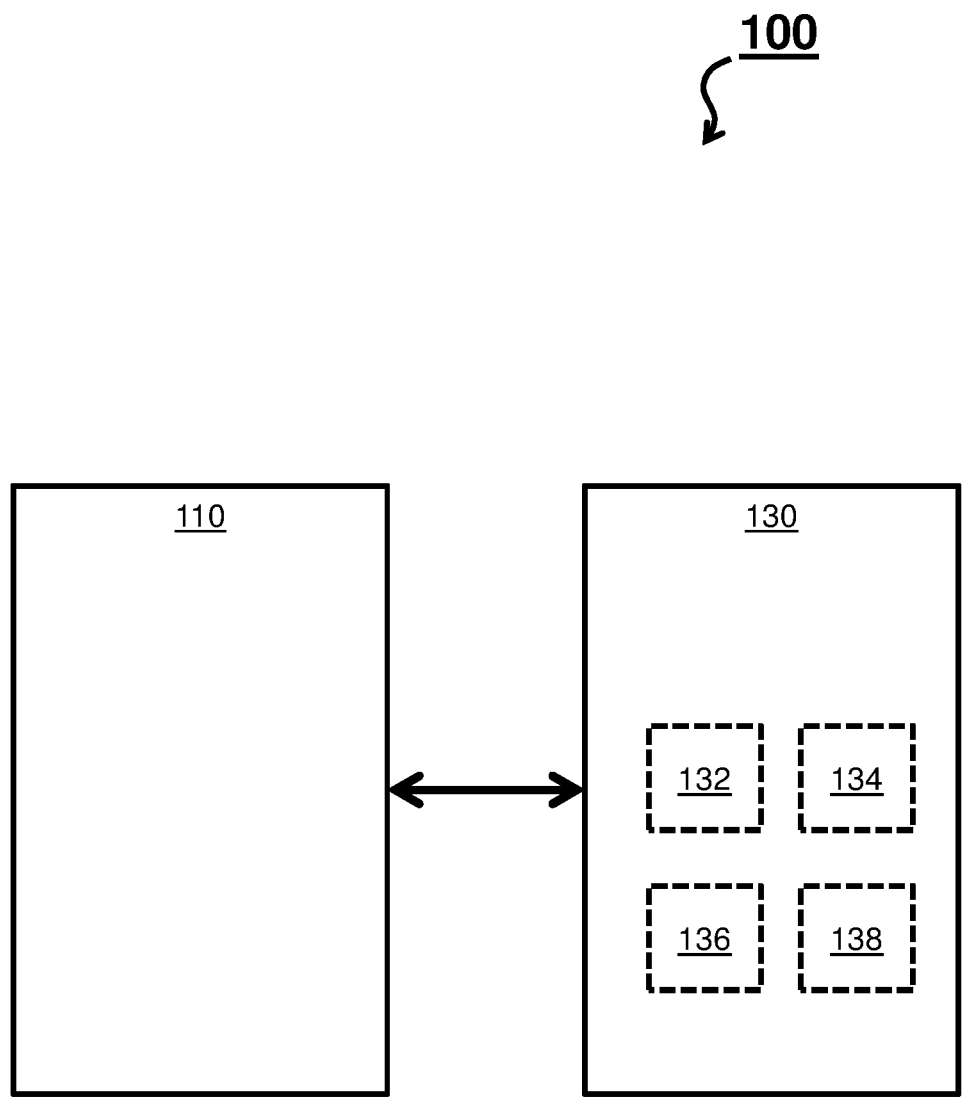
FIG. 1 depicts a throttling system in accordance with one or more embodiments.

Turning now to FIG. 1, a throttling system 100 is depicted in accordance with one or more embodiments. The throttling system 100 can be an electronic, computer framework comprising and/or employing any number and combination of processing systems (e.g., as described with respect to FIG. 5) and networks utilizing various communication technologies, as described herein.

The throttling system 100 comprises a sender 110 and a receiver 130 that exchange messages (and associated data) and responses. The sender 110, considered an originator side or a message sending side of the throttling system 100, sends the messages to and receives the responses from the receiver 130. The receiver 130, considered a message handling side of the throttling system 100, receives the messages from and replies with the responses to the sender 110. The sender 110 and the receiver 130 communicate the messages and the responses across one or more data interconnects. The sender 110 and the receiver 130 can be hardware, software, or a combination thereof that resides on the same or separate processing systems of the throttling system 100.

The receiver 130 comprises a fixed memory location 132, an upper level functionality 134, backbone support 136, and a completion queue 138. The fixed memory location 132, the upper level functionality 134, the backbone support 136, and the completion queue 138 can be hardware, software, or a combination thereof that resides on the receiver 130.

In the receiver 130, for example, the two entities of the backbone support 136 and the upper layer functionality 134 are involved in handling of the messages, execute during different processes of the receiver 130, and comprise different handling capacity.

The responsibility of the upper layer functionality 134 is to handle messages. The upper layer functionality 134 recognizes an incoming message by polling the fixed memory location 132, which is updated with a different value for each message. The fixed memory location 132 is a memory location to be written again and again. When the upper layer functionality 134 is running, it polls the fixed memory location 132 regularly and handles incoming message in a fast speed. Once a message is handled and response returned to the sender 110, the sender 110 can send a next message. The backbone support 136 recognizes an incoming message by the addition of its completion queue element (CQE) into the completion queue 138. The CQE is an information block posted to a completion queue. The completion queue 138 has a fixed capacity.

Sometimes the upper layer functionality 134 is in sleep mode (e.g., a power-saving mode of operation in which the upper layer functionality 134 is switched off until needed). In this case, the backbone support 136 getting a CQE initiative is responsible for waking up the upper layer functionality 134 to handle messages.

In an operational example of system 100, the upper layer functionality 134 can run and dispatch messages in a fast pace, where each message carries a CQE initiative and adds a CQE to the queue. If the backbone support 136 is not fast enough to pull CQEs out of the completion queue 138, the completion queue 138 will overflow. To avoid queue overflow, the receiver 130 may inform the sender 110 to send subsequent messages without carrying CQE initiatives. However, when incoming messages no longer carry CQE initiatives, any new messages can be left unattended as the completion queue 138 is drained over time and the upper layer functionality 134 is in sleep mode. The system 100 resolves the queue overflow issue associated, without the danger of leaving messages unattended. For instance, while conventional computer-networking communication, attempts to address the queue overflow issue without leaving messages unattended by stopping the sending new messages if a growing queue is approaching a dangerously high level and until backbone support removes enough elements to bring the growing queue back to safe low level, throughput is reduced since originator side stops sending new messages.

In contrast, the system 100 does not lower throughput by utilizing a scheme that checks outstanding CQEs in the completion queue 138 by the receiver 130. When the number of outstanding CQE is high, the receiver 130 instructs the sender 110 side to send future messages that do not carry CQE initiatives. When the number is low, the receiver 130 instructs the sender 110 to send future messages that carry CQE initiatives.

Figure 2:
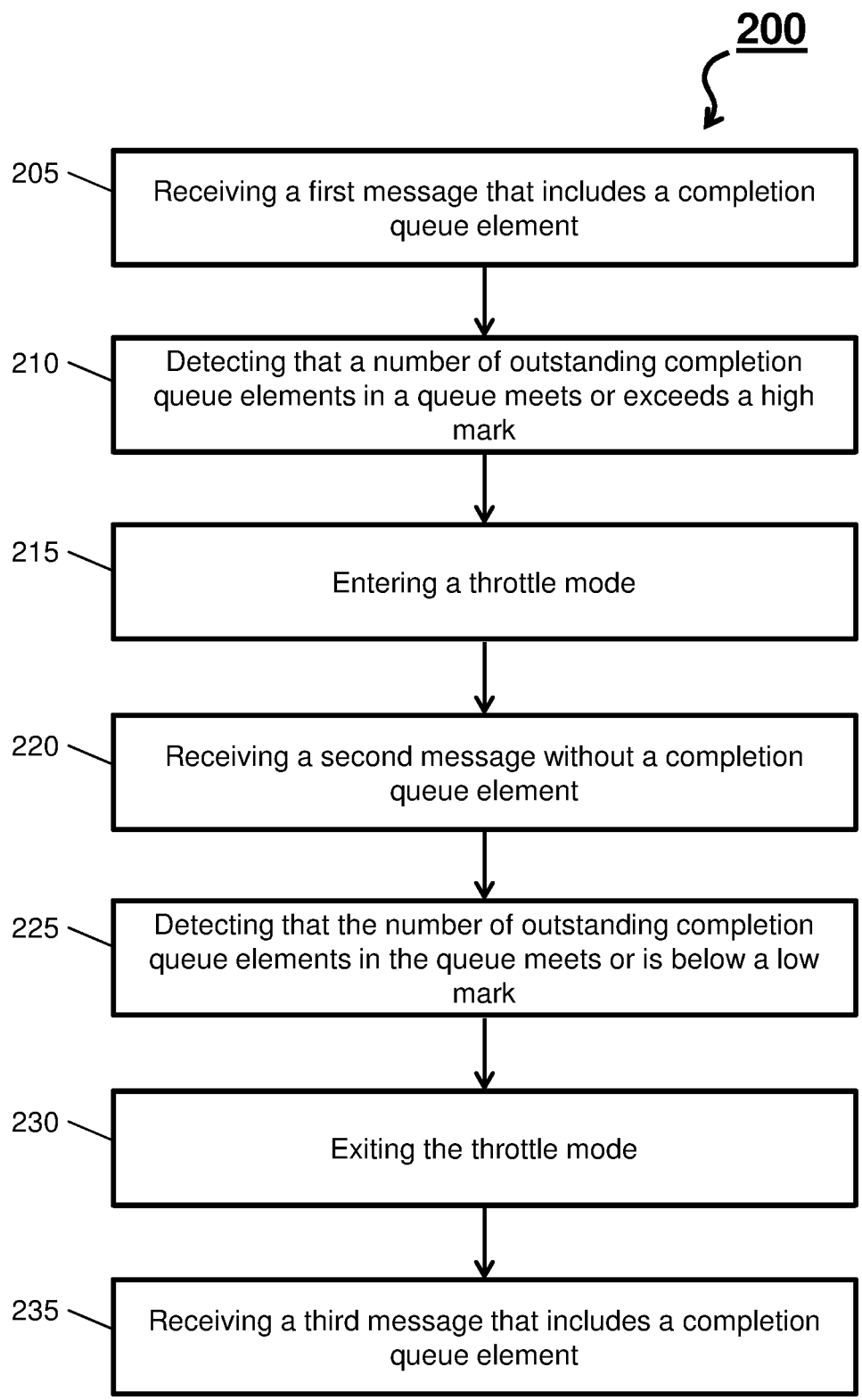
FIG. 2 depicts a process flow for message handling in accordance with one or more embodiments.

Turning now to FIG. 2, a process flow 200 for message handling in accordance with one or more embodiments is depicted. The process flow 200 is an example operation of an algorithm and two-way communications to avoid queue overflow and maintain proper initiatives without lowering throughput by the system 100. The process flow 200 begins at block 205, where the receiver 130 receives a first message that includes a CQE. Messages sent from the sender 110 always carry fixed memory location (FML) initiative. The receiver 130 receives the first message from the sender 110. Note that messages may or may not carry CQE initiative. Under "normal mode", the sender 110 sends messages with both FML and CQE initiatives. The operations of block 205 are performed under the normal mode.

At block 210, the receiver 130 detects that a number of outstanding CQEs in the completion queue 138 meets or exceeds a high mark. At block 215, the receiver 130 instructs the sender 110 to enter a throttle mode. For instance, when a size of the completion queue 138 grows to a high mark, which is a user configurable setting that preempts dangerously high queue levels, the receiver 130 sends back a response with control info telling the sender 110 to enter the throttle mode. Note that the sender 110 can interpret the information carried in the response to determine what initiative types that next outgoing message should carry. During the throttle mode, the sender 110 sends messages with only FML initiative, no CQEs are added to the completion queue 138, queue overflow is avoided, and the backbone support 136 gets time to reduce the number of "outstanding CQEs" in the completion queue 138.

At block 220, the receiver 130 receives a second message that is without a CQE. The receiver 130 receives the second message from the sender 110. The second message is sent while the system 100 is under the throttle mode. At block 225, the receiver 130 detects that a number of outstanding CQEs in the completion queue 138 meets or is below a low mark. At block 230, the receiver 130 instructs the sender 110 to exit a throttle mode. For instance, when a size of the completion queue 138 decreases to a low mark, the receiver 130 sends back a response with control info telling the sender 110 to exit the throttle mode. The high mark is a user configurable setting that indicates that completion queue 138 is full or close to full. Note again that the sender 110 can interpret the information carried in the response to determine what initiative types that next outgoing message should carry. At block 235, the receiver 130 receives a third message that includes a CQE.

Figure 3:
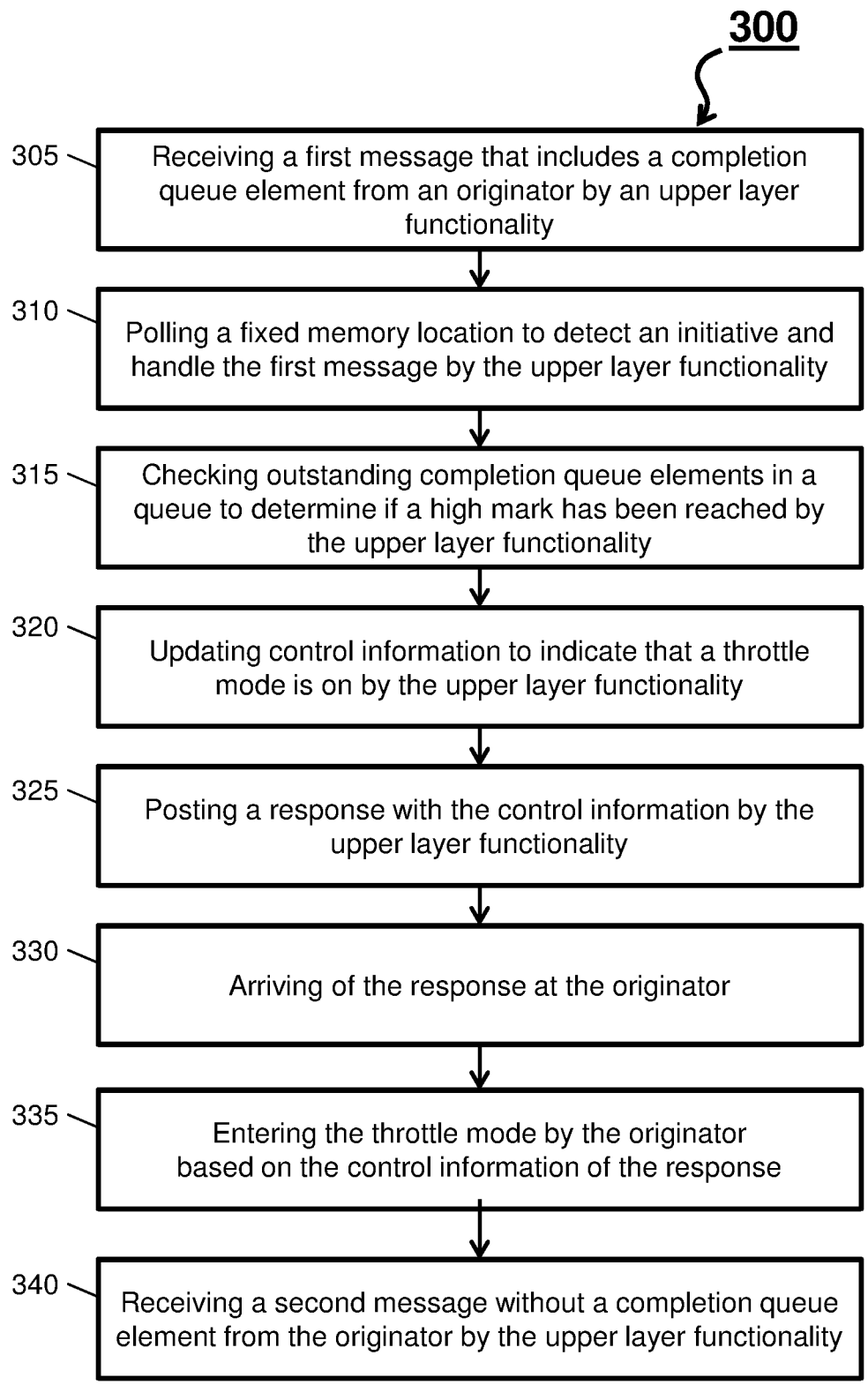
FIG. 3 depicts a process flow for enabling a throttle mode in accordance with one or more embodiments.

Turning now to FIG. 3, a process flow 300 for enabling a throttle mode in accordance with one or more embodiments is depicted. FIG. 3 is described with respect to FIG. 4, which depicts a throttling system 400 for enabling a throttle mode in accordance with one or more embodiments. Components of the throttling system 400 that are similar to the throttling system 100 have been reused for ease of explanation, by using the same identifiers, and are not re-introduced.

The process flow 300 begins at block 305, where the receiver 130 receives a first message 405. The first message 405 that includes an (FML) initiative and a CQE. Note that the first message 405 is sent under the normal mode. The FML initiative of the first message 405 is stored (see arrow 406) in the fixed memory location 132. The CQE of the first message 405 is stored (see arrow 407) in the completion queue 138.

Figure 4:
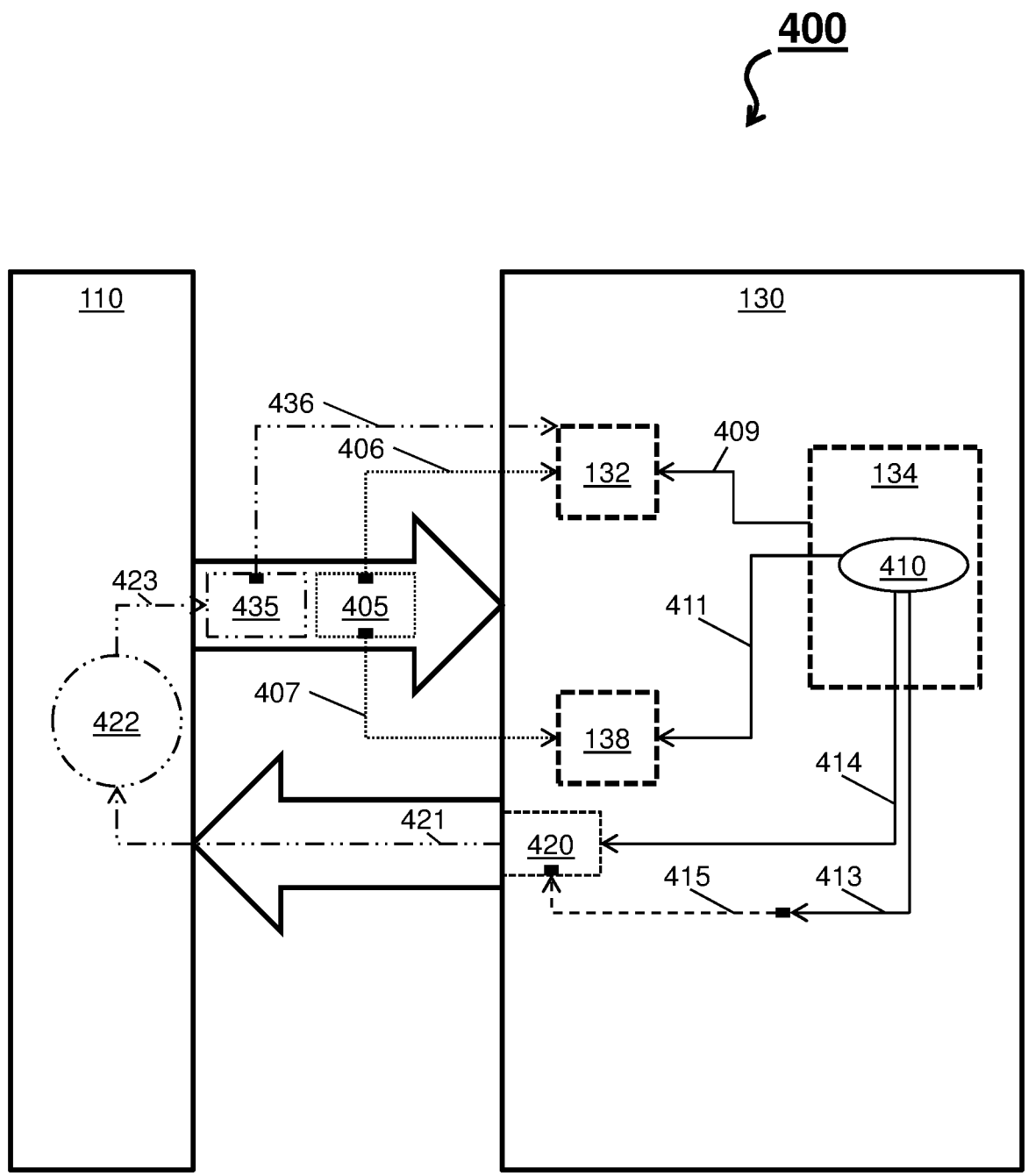
FIG. 4 depicts a throttling system for enabling a throttle mode in accordance with one or more embodiments.

At block 310, the upper layer functionality 134 polls (see arrow 409) the fixed memory location 132 to detect the FML initiative and handles the first message 405. At block 315, the upper layer functionality 134 checks for outstanding CQEs in the completion queue 138 to determine if a high mark has been reached. As shown in FIG. 4, an operation 410 is executed that causes the upper layer functionality 134 to determine (see arrow 411) a number of CQEs in the completion queue 138 and compares the number of CQEs against the high mark. When the receiver 130 detects that the number of outstanding CQEs in the completion queue 138 meets or exceeds the high mark, the upper layer functionality 134 updates (see arrow 413) control information to indicate a throttle mode. Returning to FIG. 3, at block 320, the upper layer functionality 134 updates control information to indicate that a throttle mode is on (e.g., cause the sender 110 to enter throttle mode). At block 325, the upper layer functionality 134 posts (see arrow 414) a response 420 with the control information attached (see arrow 415). Note that posting the response includes an operation by the receiver 130 that prepares the response 420 for sending and the actual operation of sending the response 420.

At block 330, the response 420 arrives (see arrow 421) at the sender 110. At block 335, the sender 110 enters (see circle 422) the throttle mode based on the control information of the response 420. At block 340, the receiver 130 receives a second message 435 (e.g., the sender 110 sends out the second message 435 without the CQE; see arrow 423). The second message 435 that includes an (FML) initiative but does not include the CQE. Note that the second message 435 is sent under the throttle mode. The FML initiative of the second message 435 is stored (see arrow 436) in the fixed memory location 132.

Figure 5:
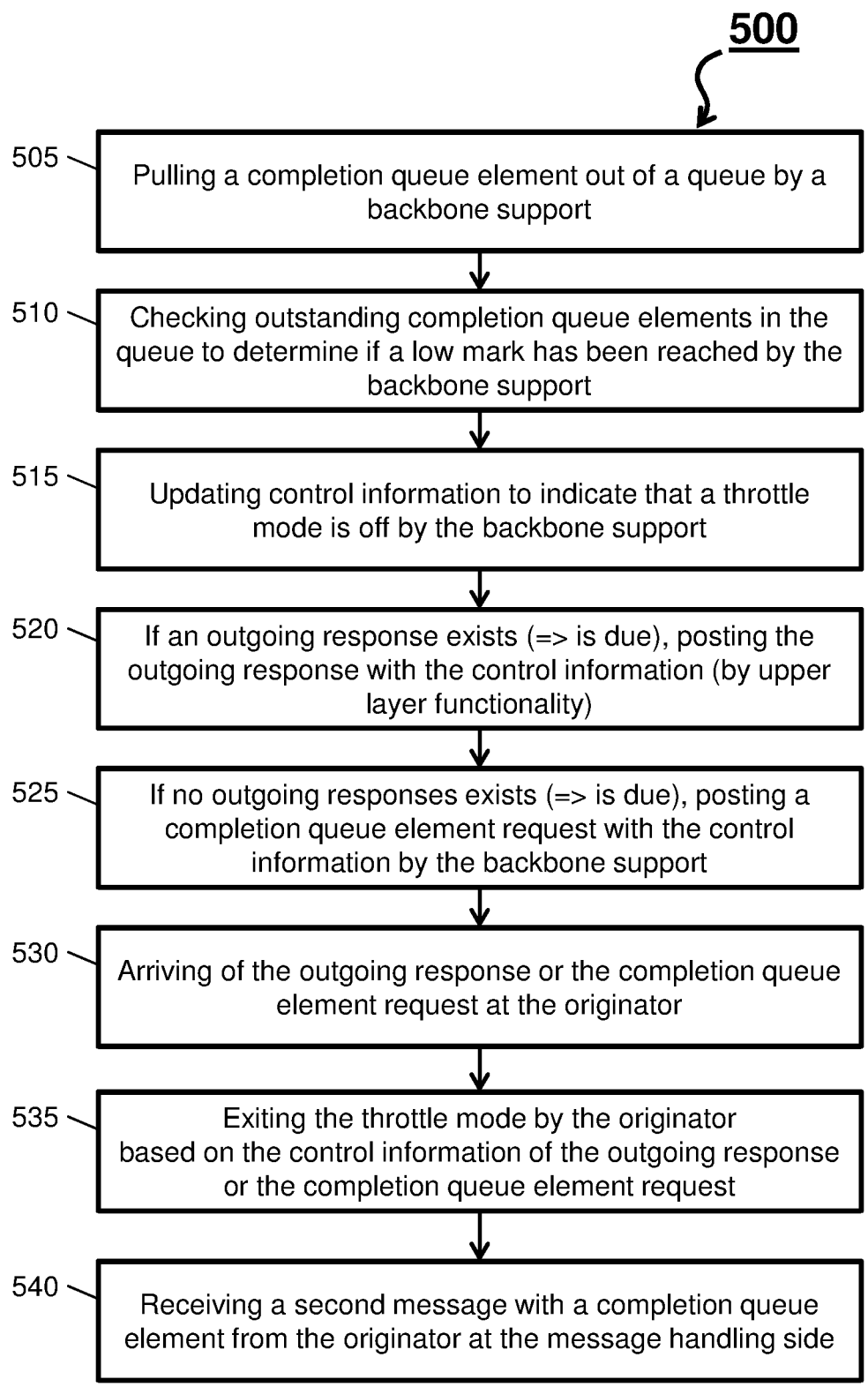
FIG. 5 depicts a process flow for exiting a throttle mode in accordance with one or more embodiments.

Turning now to FIG. 5, a process flow 500 for exiting a throttle mode in accordance with one or more embodiments is depicted. FIG. 5 is described with respect to FIG. 6, which depicts a throttling system 600 for exiting a throttle mode in accordance with one or more embodiments. Components of the throttling system 600 that are similar to the throttling system 100 have been reused for ease of explanation, by using the same identifiers, and are not re-introduced. Note that the process flow 500 executes when the number of outstanding CQEs is low enough to enable the receiver 130 to inform the sender 110 to exit the throttle mode and resume the normal mode. Thus, the process flow 500 can occur after the conclusion of the process flow 400 and after the sender 110 sends out the second message 435 without the CQE.

The process flow 500 begins at block 505, where the backbone support 136 pulls a completion queue element (see arrow 608) out of the completion queue 138. At block 510, the backbone support 136 checks (see arrow 609) for outstanding CQEs in the completion queue 138 to determine if a low mark has been reached (note that the upper layer functionality 134 can also poll the fixed memory location 132 as shown by arrow 611). The low mark is a user configurable setting that indicates that completion queue 138 is empty or close to empty. The backbone support 136 determines a number of outstanding CQEs in the completion queue 138 and compares the number of outstanding CQEs against the low mark.

At block 515, the backbone support 136 updates control information to indicate that a normal mode is on (e.g., cause the sender 110 to enter normal mode). For instance, when the backbone support 136 detects that the number of outstanding completion queue elements in the completion queue 138 meets or is below the low mark, the backbone support 136 updates (see arrow 613) control information to indicate a normal mode.

Figure 6:
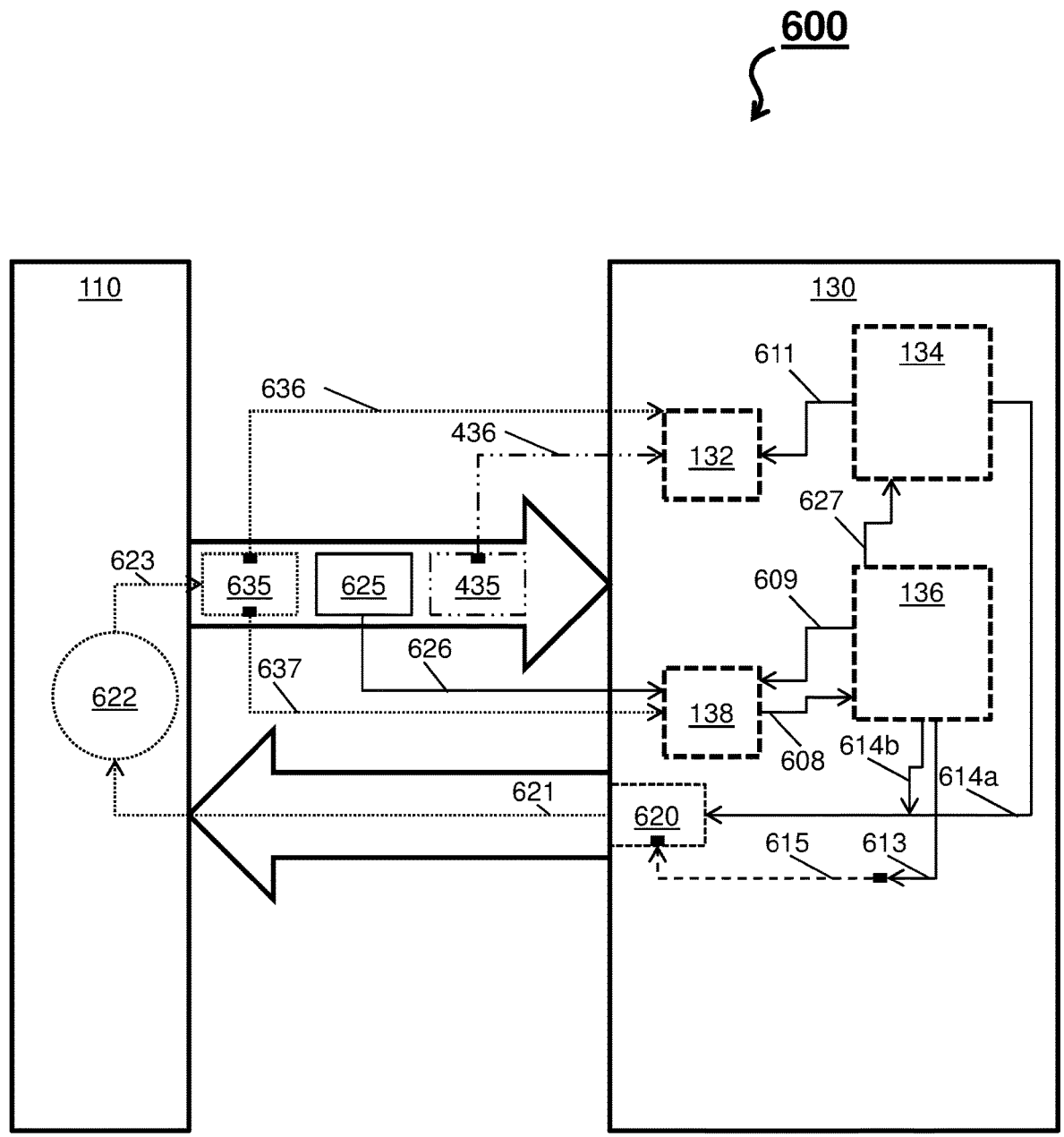
FIG. 6 depicts a throttling system for exiting a throttle mode in accordance with one or more embodiments.

At block 520, when an outgoing response exists (e.g., an outgoing response is expected), the upper layer functionality 134 posts (see arrow 614*a*) the outgoing response with the control information and nothing else needs to be done to carry the mode change info back to the sender 110. At block 525, when an outgoing response does not exist, the backbone support 136 posts (see arrow 614*b*) a CQE Request with the control information to inform the sender 110 of the mode change. Note that the CQE Request is not part of the message-response mechanism and is an independent message to the sender 110 from the backbone support 136. This is because backbone support is not directly involved in the message handling loop and has no direct control over when a response is sent back. As shown in FIG. 6, the expected outgoing response or the CQE Request is represented by a response 620 that carries control information, as inserted by arrow 615.

At block 530, the response 620 arrives (see arrow 621) at the sender 110. At block 535, the sender 110 exits (see circle 622) the throttle mode based on the control information of the response 620. Note that when the response 620 is the CQE Request, the sender 110 must send a CQE Response 625, which adds (see arrow 626) a CQE to the completion queue 138 that causes the backbone support 136 to perform a wakeup function (see arrow 627). The CQE Response is not part of the message-response mechanism. The CQE Response ensures the system 600 does not lose an initiative since there might be an out-flying message without CQE initiative.

At block 540, the receiver 130 receives a second message 635 (e.g., the sender 110 sends out the second message 635 with the CQE; see arrow 623). The second message 635 carries an FML initiative and a CQE initiative. Note that the second message 635 is sent under the normal mode. The FML initiative of the second message 635 is stored (see arrow 636) in the fixed memory location 132. The CQE of the second message 635 is stored (see arrow 637) in the completion queue 138.

Figure 7:
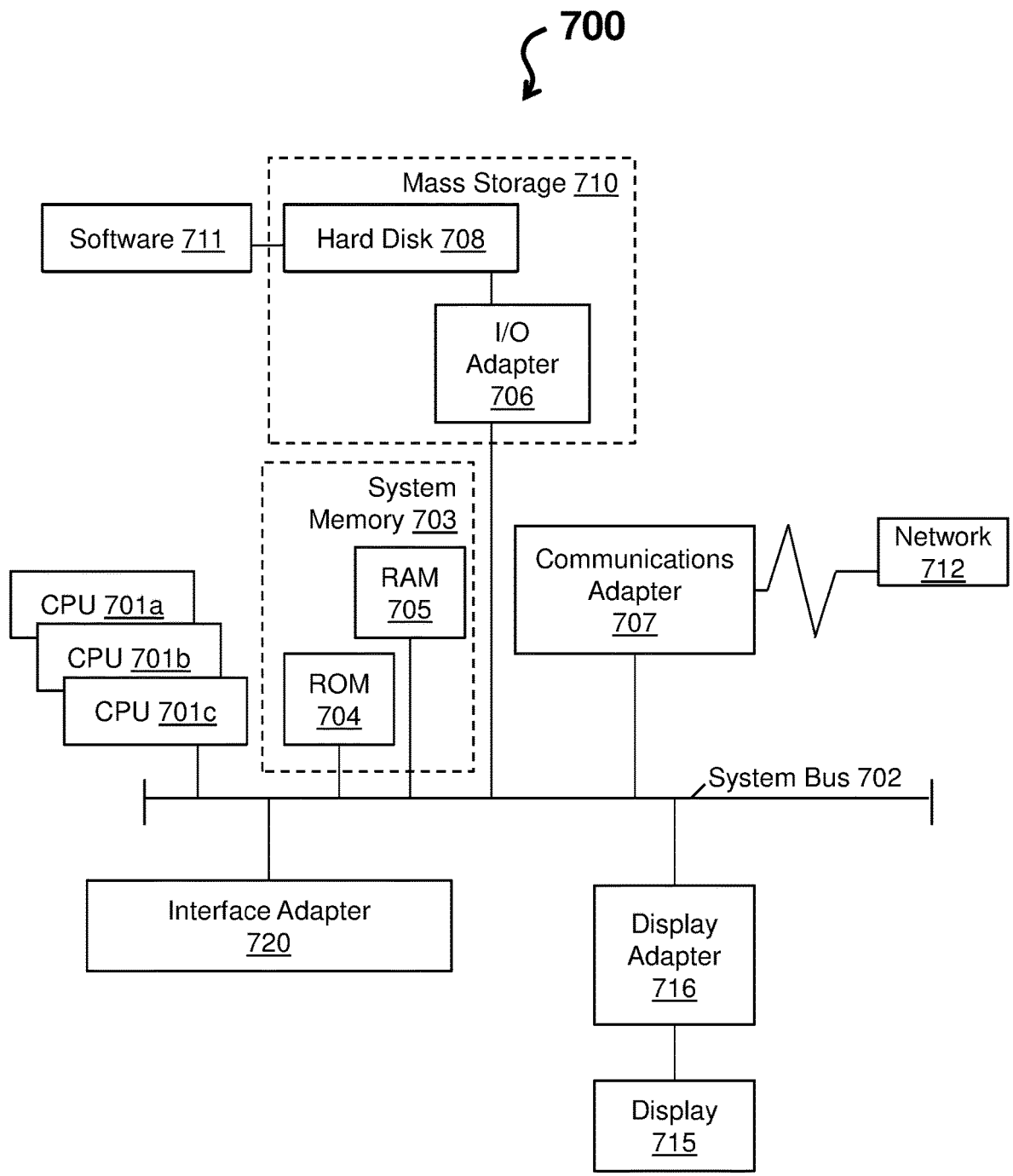
FIG. 7 illustrates a processing system in accordance with one or more embodiments.

FIG. 7 depicts an example of a system 700 in accordance with one or more embodiments. The system 700 has one or more central processing units (CPU(s)) 701*a*, 701*b*, 701*c*, etc. (collectively or generically referred to as processor(s) 701). The processors 701, also referred to as processing circuits, are coupled via a system bus 702 to system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the system 700. The RAM is read-write memory coupled to the system bus 702 for use by the processors 701.

FIG. 7 further depicts an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710. Software 711 for execution on the system 700 may be stored in the mass storage 710. The mass storage 710 is an example of a tangible storage medium readable by the processors 701, where the software 711 is stored as instructions for execution by the processors 701 to cause the system 700 to operate, such as is described herein with reference to FIGS. 2-3 and 5. Examples of computer program product and the execution of such instruction is discussed herein in more detail. Referring again to FIG. 7, an a communications adapter 707 interconnects the system bus 702 with a network 712, which may be an outside network, enabling the system 700 to communicate with other such systems. A display (e.g., screen, a display monitor) 715 is connected to the system bus 702 by a display adapter 716, which may include a graphics controller to improve the performance of graphics intensive applications and a video controller. In one embodiment, the adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 702 via an interface adapter 720 and the display adapter 716. A keyboard, a mouse, a speaker, etc. can be interconnected to the system bus 702 via the interface adapter 720, which may include, for example, a Super I/O chip integrating multiple device adapters into a single integrated circuit.

Thus, as configured in FIG. 7, the system 700 includes processing capability in the form of the processors 701, and, storage capability including the system memory 703 and the mass storage 710, input means such as the keyboard and the mouse, and output capability including the speaker and the display 715. In one embodiment, a portion of the system memory 703 and the mass storage 710 collectively store an operating system, such as the z/OS or AIX operating system from IBM Corporation, to coordinate the functions of the various components shown in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for message handling between a receiver and a sender of a throttling system, the computer-implemented method comprising:
   receiving, by the receiver from the sender, a first message including a completion queue element, a completion queue initiative configured to perform a wakeup operation to cause the receiver to handle the first message, and a fixed memory location initiative configured for storing a data value for the first message;
   detecting, by the receiver, that a number of outstanding completion queue elements in a completion queue meets or exceeds a high mark, the high mark a user configurable setting;
   instructing the sender, by the receiver, to enter a throttle mode in response to the number meeting or exceeding the high mark;
   receiving, by the receiver from the sender, a second message without a completion queue element;
   detecting, by the receiver, that the number of the outstanding completion queue elements in the completion queue meets or is below a low mark; and
   instructing the sender, by the receiver, to exit the throttle mode in response to the number meeting or being below the low mark.

2. The computer-implemented method of claim 1, wherein a backbone support of the receiver invoked by the completion queue element performs the wakeup operation to cause an upper layer functionality of the receiver to poll on the fixed memory location initiative, handle the first message, and post a response.

3. The computer-implemented method of claim 1, wherein an upper layer functionality of the receiver posts a response with control information that instructs the sender to:
   enter the throttle mode in response to the number meeting or exceeding the high mark or
   enter a normal mode in response to the number meeting or being lower than the low mark.

4. The computer-implemented method of claim 1, wherein a backbone support of the receiver posts a request with control information that instructs the sender to enter a normal mode in response to the number meeting or being lower than low mark.

5. The computer-implemented method of claim 1, wherein the first message is received while the sender is operating under a normal mode.

6. The computer-implemented method of claim 1, wherein the second message comprises a fixed memory location initiative configured for storing a data value for the second message.

7. A computer program product or message handling between a receiver and a sender of a throttling system, the computer program product comprising a non transitory computer readable storage medium having program instructions embodied therewith, the program instructions executable by the throttling system to cause:
   receiving, by the receiver from the sender, a first message including a completion queue element, a completion queue initiative configured to perform a wakeup operation to cause the receiver to handle the first message, and a fixed memory location initiative configured for storing a data value for the first message:
   detecting, by the receiver, that a number of outstanding completion queue elements in a completion queue meets or exceeds a high mark, the high mark a user configurable setting:
   instructing the sender, by the receiver, to enter a throttle mode in response to the number meeting or exceeding the high mark;
   receiving, by the receiver from the sender, a second message without a completion queue element;
   detecting, by the receiver, that the number of the outstanding completion queue elements in the completion queue meets or is below a low mark; and
   instructing the sender, by the receiver, to exit the throttle mode in response to the number meeting or being below the low mark.

8. The computer program product of claim 7, wherein a backbone support of the receiver invoked by the completion queue element performs wakeup operation to cause an upper layer functionality of the receiver to poll on the fixed memory location initiative, handle the first message, and post a response.

9. The computer program product of claim 7, wherein an upper layer functionality of the receiver posts a response with control information that instructs the sender to:
   enter the throttle mode in response to the number meeting or exceeding the high mark or
   enter a normal mode in response to the number meeting or being lower than the low mark.

10. The computer program product of claim 7, wherein a backbone support of the receiver posts a request with control information that instructs the sender to enter a normal mode in response to the number meeting or being lower than low mark.

11. The computer program product of claim 7, wherein the first message is received while the sender is operating under a normal mode.

12. The computer program product of claim 7, wherein the second message comprises a fixed memory location initiative configured for storing a data value for the second message.

13. A throttling system for message handling, the system comprising:
   a receiver; and
   a sender comprising a processor and a memory storing program instructions thereon, the program instructions executable by the processor to cause the sender to:
   receive, from the sender, a first message including a completion queue element, a completion queue initiative configured to perform a wakeup operation to cause the receiver to handle the first message, and a fixed memory location initiative configured for storing a data value for the first message;
detect that a number of outstanding completion queue elements in a completion queue meets or exceeds a high mark;
instruct the sender to enter a throttle mode in response to the number meeting or exceeding the high mark, the high mark a user configurable setting;
receive, from the sender, a second message without a completion queue element;
detect that the number of the outstanding completion queue elements in the completion queue meets or is below a low mark; and
instruct the sender to exit the throttle mode in response to the number meeting or being below the low mark.

14. The system of claim 13, wherein a backbone support of the receiver invoked by the completion queue element performs the wakeup operation to cause an upper layer functionality of the receiver to poll on the fixed memory location initiative, handle the first message, and post a response.

15. The system of claim 13, wherein an upper layer functionality of the receiver posts a response with control information that instructs the sender to:
enter the throttle mode in response to the number meeting or exceeding the high mark or
enter a normal mode in response to the number meeting or being lower than the low mark.

16. The system of claim 13, wherein a backbone support of the receiver posts a request with control information that instructs the sender to enter a normal mode in response to the number meeting or being lower than low mark.

17. The system of claim 13, wherein the first message is received while the sender is operating under a normal mode.

* * * * *